United States Patent
Gill et al.

(10) Patent No.: US 9,708,827 B1
(45) Date of Patent: Jul. 18, 2017

(54) RELOCATABLE CORROSION CONTROL FACILITY

(71) Applicants: Peter E. Gill, Tamuning, GU (US); Peter E. Gill, III, Tamuning, GU (US)

(72) Inventors: Peter E. Gill, Tamuning, GU (US); Peter E. Gill, III, Tamuning, GU (US)

(73) Assignee: KWIKSPACE GU (US)

( * ) Notice: Subject to any disclaimer, the term of this patent is extended or adjusted under 35 U.S.C. 154(b) by 0 days.

(21) Appl. No.: 15/378,114

(22) Filed: Dec. 14, 2016

(51) Int. Cl.
| | |
|---|---|
| *E04H 1/00* | (2006.01) |
| *E04H 3/00* | (2006.01) |
| *E04H 5/00* | (2006.01) |
| *E04H 6/00* | (2006.01) |
| *E04H 9/00* | (2006.01) |
| *E04H 14/00* | (2006.01) |
| *E04H 5/02* | (2006.01) |
| *E04F 11/02* | (2006.01) |
| *E04H 6/44* | (2006.01) |
| *B64F 5/30* | (2017.01) |
| *B64F 5/40* | (2017.01) |

(52) U.S. Cl.
CPC ............... *E04H 5/02* (2013.01); *B64F 5/30* (2017.01); *B64F 5/40* (2017.01); *E04F 11/02* (2013.01); *E04H 6/44* (2013.01)

(58) Field of Classification Search
CPC . E04H 5/02; E04H 6/44; E04H 1/1277; B64F 5/40; B64F 5/0081; B64F 5/30; F24F 3/161
See application file for complete search history.

(56) References Cited

U.S. PATENT DOCUMENTS

| | | | | |
|---|---|---|---|---|
| H785 H | * | 6/1990 | Merritt | F24F 3/16 55/385.2 |
| 5,551,102 A | * | 9/1996 | Stewart | E04H 1/1277 4/612 |
| 5,562,539 A | * | 10/1996 | Hashimoto | F24F 3/161 454/140 |
| 9,518,748 B2 | * | 12/2016 | Holtz | C12M 37/00 |
| 2009/0126285 A1 | * | 5/2009 | Suh | C12M 23/44 52/79.1 |
| 2013/0071573 A1 | * | 3/2013 | Brewer | B05B 13/005 427/421.1 |
| 2016/0031570 A1 | * | 2/2016 | Ordy | G10L 15/1822 705/7.42 |

OTHER PUBLICATIONS

Air Force, Air Force Corrosion Control Facility Reference Guide, Revision 10, Dec. 17, 2010.

* cited by examiner

*Primary Examiner* — Brian Mattei
(74) *Attorney, Agent, or Firm* — Donald J. Ersler

(57) ABSTRACT

A relocatable corrosion control facility preferably includes a red zone, a yellow zone and a green zone. The red zone is a work area. The work area preferably includes at least one combination paint and sanding booth, an eye wash, a compressor, an air tank, a storage enclosure and a hazardous storage. The yellow zone is an undressing area. The undressing area preferably includes at least two air showers; a respirator and personal protective equipment locker room (RPPE); and at least one dirty locker room. The technician removes equipment in the RPPE locker room and exits into a dirty locker room. The dirty locker room includes dirty clothes storage, showers and sinks. An exit of each dirty locker room leads into a green zone. The green zone is a staging area. The staging area includes at least one clean locker room, at least one office and a lobby.

20 Claims, 4 Drawing Sheets

RELOCATABLE CORROSION CONTROL FACILITY

BACKGROUND OF THE INVENTION

1. Field of the Invention

The present invention relates generally to corrosion treatment and more specifically to a relocatable corrosion control facility, which decreases the possibility of cross-contamination of hazardous particulates from hazardous particulates by having three separated zones.

2. Discussion of the Prior Art

It appears that the prior art does not teach or suggest a relocatable corrosion control facility for the de-paint, corrosion removal and repaint of different types of equipment, such as aircraft, vehicle metal parts and the like. Hazardous particulate management is paramount, because the effects of cross contamination are deadly, and sometimes the effects are not realized until 5-10 years later. Chemicals used in the process of aircraft corrosion control can be hazardous to workers, corrosive to the facility infrastructure, and require considerable floor space to store, access, and distribute. The hazardous particulates are independently managed in applicant's facility, the hazardous particulates can come from the following activities/materials, such as aircraft washing; repair and touchup painting of aircraft; full aircraft repainting; finish curing and drying; depainting with chemical and dry media; component painting; paint mixing; and chemical and paint storage.

Accordingly, there is a clearly felt need in the art for a relocatable corrosion control facility, decreases the possibility of cross-contamination of corrosion from hazardous particulates by having three different zones with at least two air showers between a work zone and an undressing zone.

SUMMARY OF THE INVENTION

The present invention provides a relocatable corrosion control facility for de-painting, removal of corrosion and re-painting of different types of equipment, such as aircraft, vehicle metal parts and the like. The relocatable corrosion control facility preferably includes the ability to withstand airspeeds up to 210 mph; and be assembled and disassembled in a matter of weeks. The relocatable corrosion control facility preferably includes a red zone, a yellow zone and a green zone. The red zone is where the de-painting, corrosion removal and re-painting occur. The red zone is a work area. The work area preferably includes at least one combination paint and sanding booth, an eye wash, a compressor, an air tank, an eye wash, a storage enclosure and a hazardous storage enclosure and an air conditioning unit. An additional combination paint and sanding booth would require an additional eye wash, a compressor, an air tank, a storage enclosure and an air conditioning unit.

The yellow zone is an undressing area. A set of stairs provides a vertical translation from the work area to a first air shower. The stairs are preferably made from steel grates with spill pans placed below the steel grates. The technician shakes them self over the steel grates in the stairs. Some of the hazardous particulates fall into the spill pans. The spill pans are emptied, once they are full. The undressing area includes at least two air showers; a respirator and a personal protective equipment (RPPE) locker room; and at least one dirty locker room. The stairs and first air shower are preferably located inside the work area. The technician enters the first air shower from the stairs and is vacuumed by the first air shower for some period of time. Each air shower is a self-contained unit and includes an entrance and an exit. Each air shower provides a barrier between a contaminated environment and a less contaminated environment. The technician leaves the first air shower and then enters a second air shower. The second air shower preferably blows air at different angles to remove additional particles.

The technician may enter a third optional air shower. The third optional air shower is located before an entrance to the RPPE locker room. The third air shower removes additional particles from the technician. The technician exits the third optional shower and enters the RPPE locker room. The RPPE locker room includes an RPPE locker and a sink. The technician removes respirators, gloves, boots, Tyvek suits and the like in the RPPE locker room and places the equipment in a RPPE locker. The technician exits the RPPE locker room into a dirty locker room. The dirty locker room includes dirty clothes storage, showers and sinks. An exit of each dirty locker room leads into a green zone. The green zone is a staging area. The staging area preferably includes at least one clean locker room, at least one office and a lobby. The lobby includes an entrance. The lobby provides access to the at least one office and to the at least one clean locker room. Each clean locker room includes clean clothes storage, clean toilets and clean sinks. The red zone, yellow zone and green zone preferably include independent air conditioning systems, to further prevent contamination.

Accordingly, it is an object of the present invention to provide a relocatable corrosion control facility, which decreases the possibility of cross-contamination of corrosion from hazardous particulates by having three separated zones.

These and additional objects, advantages, features and benefits of the present invention will become apparent from the following specification.

DETAILED DESCRIPTION OF THE PREFERRED EMBODIMENTS

Figure 1:
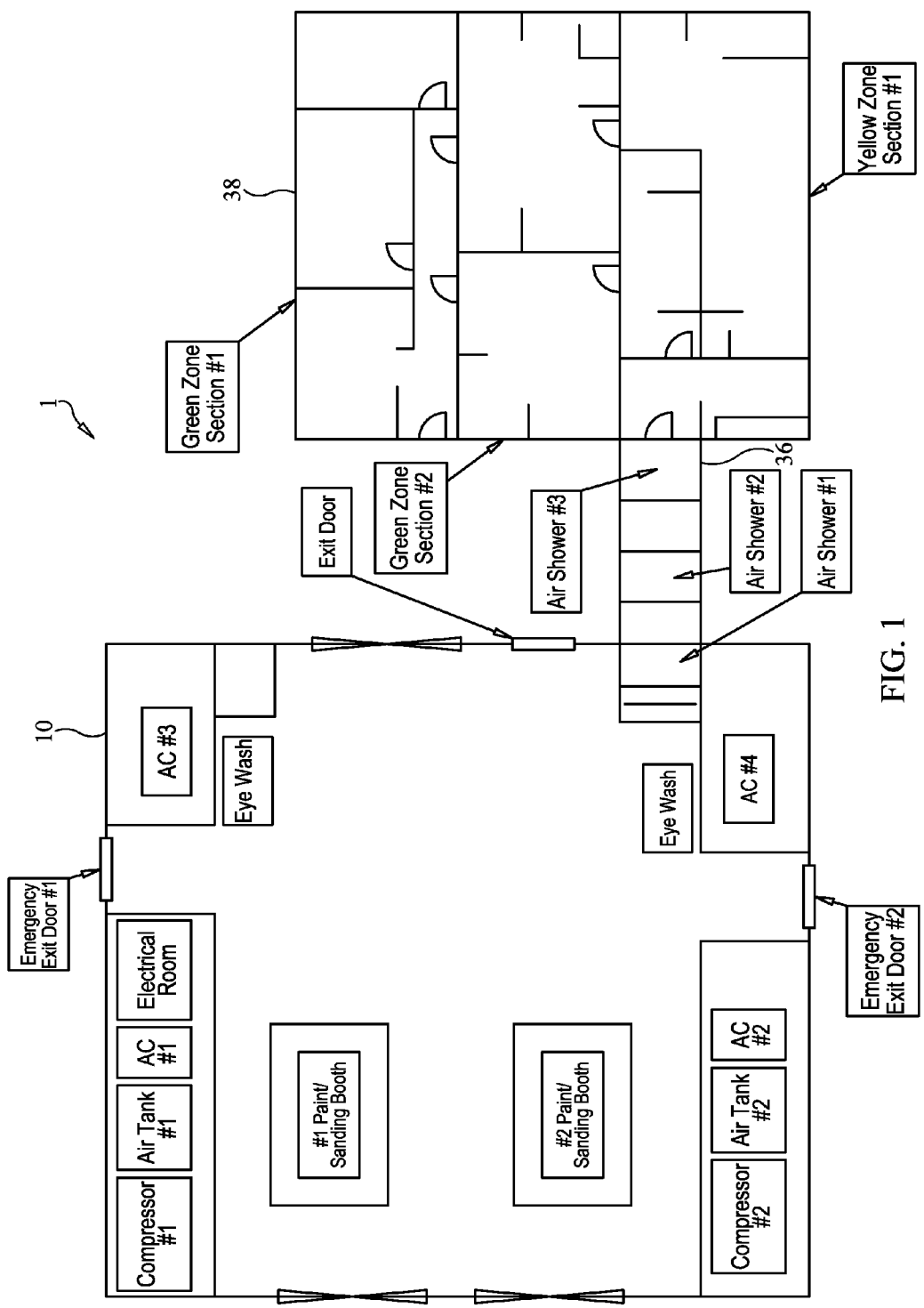
FIG. 1 is a floor plan of a relocatable corrosion control facility in accordance with the present invention.
Figure 2:
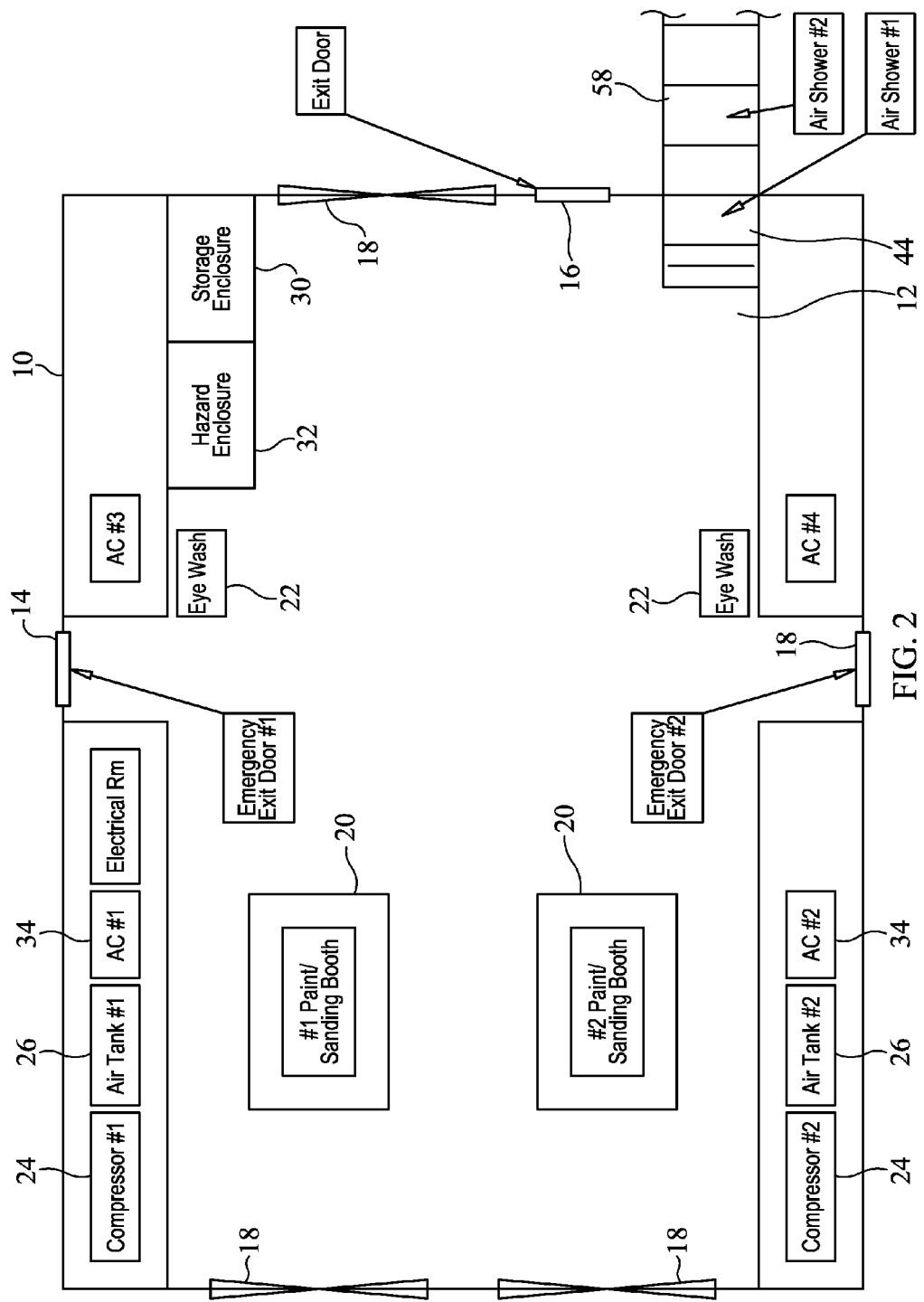
FIG. 2 is a floor plan of a work area of a relocatable corrosion control facility in accordance with the present invention.
Figure 3:
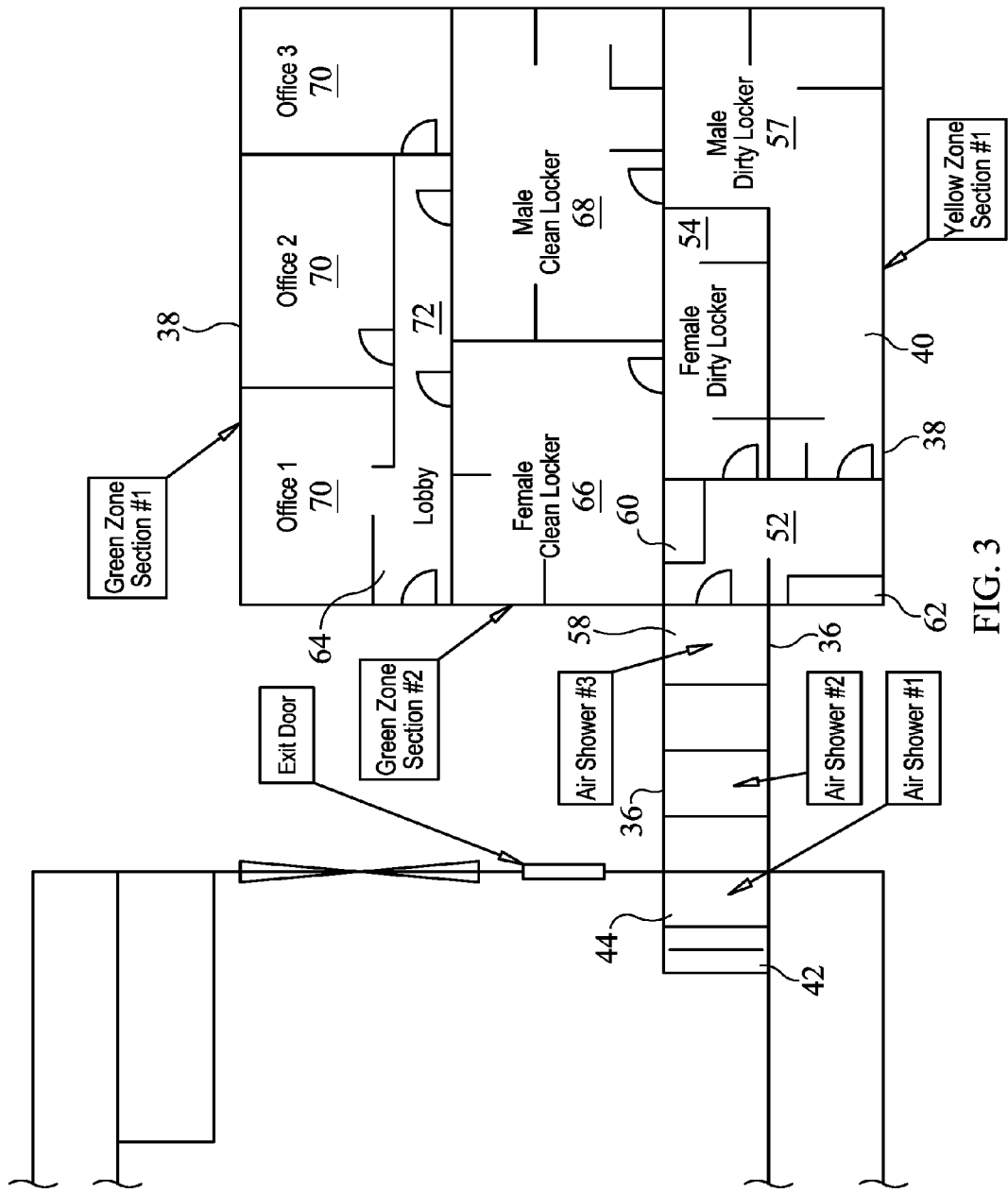
FIG. 3 is a floor plan of an undressing area and staging area of a relocatable corrosion control facility in accordance with the present invention.

With reference now to the drawings, and particularly to FIG. 1, there is shown a floor plan of a relocatable corrosion control facility 1. With reference to FIGS. 2-3, the relocatable corrosion control facility 1 preferably includes the ability to withstand airspeeds up to 210 mph; and be assembled and disassembled in a matter of weeks. The relocatable corrosion control facility 1 preferably includes a red zone, a yellow zone and a green zone. The red zone is where the de-painting, corrosion removal and re-painting occur. The red zone is a work area. The building 10 preferably includes at least one emergency exit door 14, at least one exit door 16 and at least one large door 18. The work area 12 includes at least one combination paint and sanding booth 20, an eye wash 22, a compressor 24, an air tank 26, a storage enclosure 30, a hazardous storage enclosure 32 and an air conditioning unit 34. An additional combination paint and sanding booth 20 would require an additional eye wash 22, compressor 24, air tank 26, storage enclosure 30 and air conditioning unit 34.

Figure 4:
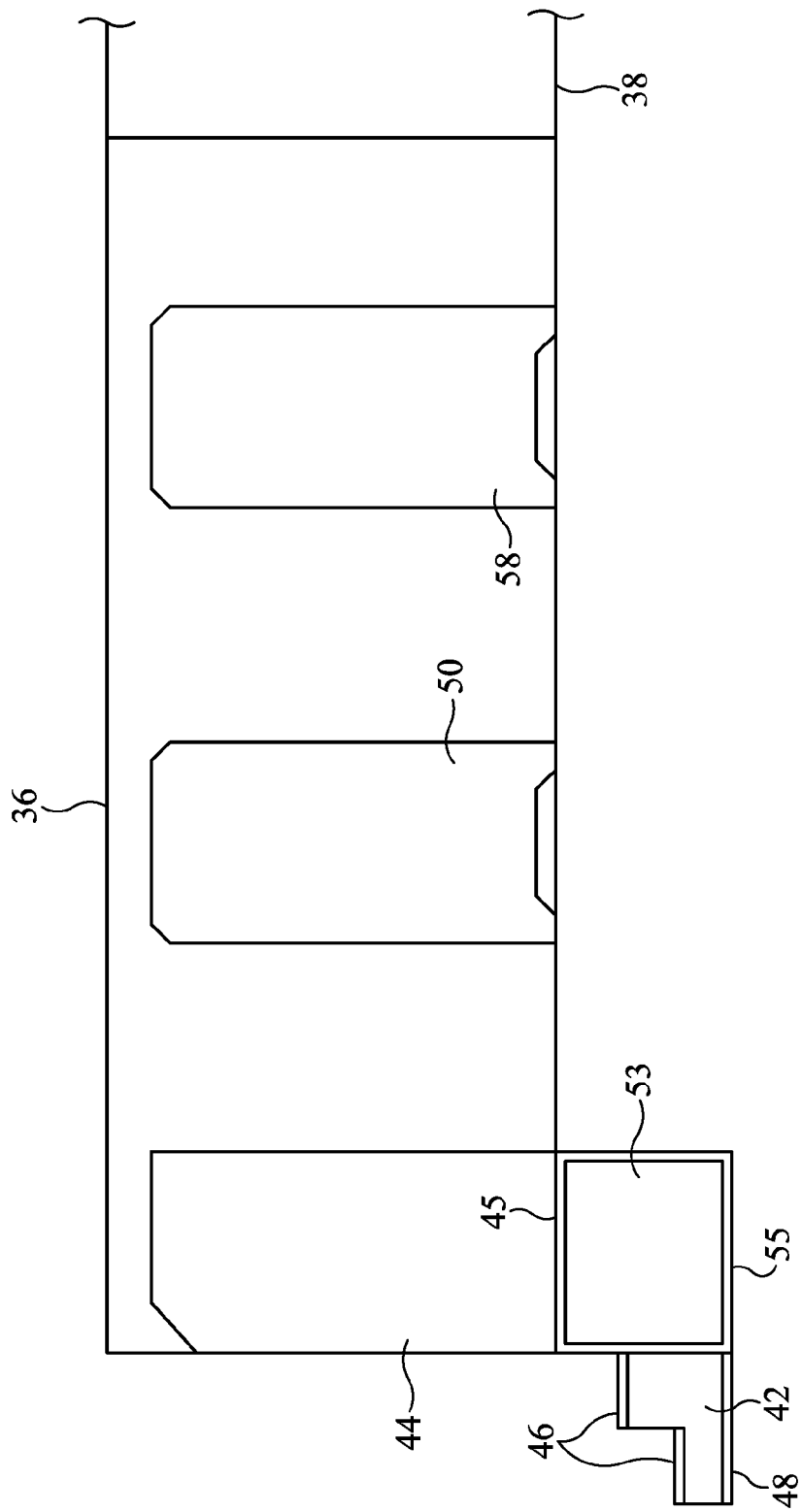
FIG. 4 is a side view of a portion of the work area and undressing area of a relocatable corrosion control facility in accordance with the present invention.

The yellow zone is located in a clean extension 36 and a portion of a clean building 38. The yellow zone is an undressing area 40. With reference to FIG. 4, a set of stairs 42 provides a vertical translation from the work area 12 to a first air shower 44. Stepping surfaces 46 of the stairs 42 are preferably steel grates. A spill pan 48 is placed below the stepping surfaces 46. A technician shakes themselves-off when stepping on the steel grates to capture some of the hazardous particulates. The hazardous particulates fall into the spill pan 48. The spill pan 48 is emptied when full. The undressing area 40 includes at least two air showers 44, 50; a respirator and personal protective equipment (RPPE) locker room 52; and at least one dirty locker room 54. The stairs 42 and first air shower 44 are located inside the work area 12. The technician enters the first air shower 44 from the stairs 42 and is vacuumed by the first air shower 44 for some period of time. The floor of the first air shower 44 is preferably a metal grate 45. A holding tank 53 is preferably located below the air shower 44 to receive hazardous particulates from the first air shower 44. A HEPA filter terminates an air output of the holding tank 53. A spill pan 55 is located below the holding tank 53 to receive hazardous particles passing through the grate 45. Each air shower 44, 50 is a self-contained unit and includes an entrance and an exit. Each air shower 44, 50 provides a barrier between a contaminated environment and a less contaminated environment. The technician leaves the first air shower 44 and then enters the second air shower 50, which preferably blows air at different angles to remove additional particles.

The technician may enter a third optional air shower 58. The third optional air shower 58 is located before an entrance to the RPPE locker room 52. The third air shower 58 removes additional particles from the technician. The technician exits the third optional shower 58 and enters the RPPE locker room 52. The RPPE locker room 52 preferably includes an RPPE locker 60 and a sink 62. The technician removes respirators, gloves, boots, Tyvek suits and the like in the RPPE locker room 52 and places the equipment in a RPPE locker 60. The technician exits the RPPE locker room 52 into a female locker room 54, or a male locker room 57. The dirty locker room 54, 57 preferably includes a dirty clothes storage, showers and sinks. An exit of each dirty locker room 54, 55 leads into a green zone. The green zone is a staging area 64. The staging area 64 includes a female clean locker room 66, a male clean locker room 68, at least one office 70 and a lobby 72. The lobby includes an entrance. The lobby 72 provides access to the at least one office 70 and to the female and male clean locker rooms 66, 68. Each clean locker room preferably includes clean clothes storage, clean toilets, clean sinks and clean showers. The work area 12, undressing area 40 and the staging area 64 all preferably have separate air conditioning systems to prevent cross contamination.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A relocatable corrosion control facility comprising:
   a work area includes at least one combination paint and sanding booth and a hazardous storage enclosure;
   an undressing area includes at least one air shower, a respirator and personal protective equipment locker room and at least one dirty locker room, one of said at least one air shower vacuums particles, said respirator and personal protective equipment locker room exits into said at least one dirty locker room; and
   a staging area includes at least one clean locker room, said at least one dirty locker room exits into said at least one clean locker room.

2. The relocatable corrosion control facility of claim 1, further comprising:
   a set of stairs provides an upward vertical transition from said work area into said undressing area.

3. The relocatable corrosion control facility of claim 2, further comprising:
   said stairs include stepping surfaces fabricated from steel grates, a spill pan is placed below said stepping surfaces.

4. The relocatable corrosion control facility of claim 1, further comprising:
   said relocatable corrosion control facility is capable of withstanding airspeeds of up to 210 mph.

5. The relocatable corrosion control facility of claim 1 wherein:
   said work area, said undressing area and said staging include independent air conditioning systems.

6. The relocatable corrosion control facility of claim 5 wherein: a first air shower of the at least one air shower is located inside said work area.

7. The relocatable corrosion control facility of claim 1 wherein: a portion of said undressing area and said staging area are located inside a clean building.

8. A relocatable corrosion control facility comprising:
   a work area includes at least one combination paint and sanding booth and a hazardous storage enclosure;
   an undressing area includes at least one air shower, a respirator and a personal protective equipment locker room and at least one dirty locker room, said work area exits into said undressing area, one of said at least one air shower vacuums particles, said respirator and personal protective equipment locker room exits into said at least one dirty locker room; and
   a staging area includes at least one clean locker room, said at least one dirty locker room exits into said at least one clean locker room.

9. The relocatable corrosion control facility of claim 8, further comprising:
   a set of stairs provides an upward vertical transition from said work area into said undressing area.

10. The relocatable corrosion control facility of claim 9, further comprising:
    said stairs include stepping surfaces fabricated from steel grates, a spill pan is placed below said stepping surfaces.

11. The relocatable corrosion control facility of claim 8, further comprising:
    said relocatable corrosion control facility is capable of withstanding airspeeds of up to 210 mph.

12. The relocatable corrosion control facility of claim 8 wherein:
said work area, said undressing area and said staging include independent air conditioning systems.

13. The relocatable corrosion control facility of claim 12 wherein: a first air shower of the at least one air shower is located inside said work area.

14. The relocatable corrosion control facility of claim 8 wherein: a portion of said undressing area and said staging area are located inside a clean building.

15. A relocatable corrosion control facility comprising:
a work area includes at least one combination paint and sanding booth and a hazardous storage enclosure;
an undressing area includes at least two air showers, a respirator and a personal protective equipment locker room and at least one dirty locker room, a first air shower of said at least two air showers vacuums debris, a second air shower of said at least two air showers blows at different angles, said personal protective equipment locker room exits into said at least one dirty locker room; and
a staging area includes at least one clean locker room, said at least one dirty locker room exits into said at least one clean locker room.

16. The relocatable corrosion control facility of claim 15 wherein:
said staging area includes at least one office and a lobby, said lobby provides access to said at least one office and said at least one clean locker room.

17. The relocatable corrosion control facility of claim 15, further comprising:
a set of stairs provides an upward vertical transition from said work area into said undressing area.

18. The relocatable corrosion control facility of claim 15, further comprising:
said stairs include stepping surfaces fabricated from steel grates, a spill pan is placed below said stepping surfaces.

19. The relocatable corrosion control facility of claim 15, further comprising:
said relocatable corrosion control facility is capable of withstanding airspeeds of up to 210 mph.

20. The relocatable corrosion control facility of claim 15 wherein:
said work area, said undressing area and said staging include independent air conditioning systems.

* * * * *